United States Patent [19]

Lawson

[11] 4,454,280

[45] * Jun. 12, 1984

[54] POLYMERS HAVING REDUCED CARBON MONOXIDE GENERATION UPON BURNING

[75] Inventor: David F. Lawson, Uniontown, Ohio

[73] Assignee: The Firestone Tire & Rubber Company, Akron, Ohio

[*] Notice: The portion of the term of this patent subsequent to Nov. 30, 1999 has been disclaimed.

[21] Appl. No.: 402,881

[22] Filed: Jul. 29, 1982

Related U.S. Application Data

[63] Continuation of Ser. No. 249,515, Mar. 31, 1981, Pat. No. 4,361,668.

[51] Int. Cl.³ ............................................. C08K 5/09
[52] U.S. Cl. .................................................... 524/398
[58] Field of Search ........................................ 524/398

[56] References Cited

U.S. PATENT DOCUMENTS

| | | | |
|---|---|---|---|
| 3,968,064 | 7/1976 | Dickens | 524/398 |
| 3,996,173 | 12/1976 | Heichele | 524/398 |
| 4,038,228 | 7/1977 | Taylor | 524/398 |
| 4,126,593 | 11/1978 | Takahashi | 524/398 |
| 4,272,427 | 6/1981 | Davis | 524/398 |

FOREIGN PATENT DOCUMENTS 1044503 10/1966 United Kingdom .

*Primary Examiner*—Paul R. Michl
*Attorney, Agent, or Firm*—Daniel N. Hall

[57] ABSTRACT

The incorporation of an alkaline earth hydroxide or oxide in a non-nitrogen-containing polymer results in the reduction of carbon monoxide and visible smoke generated during burning of the polymer. The polymer may be an elastomer, (that is a rubber), a thermoplastic, a thermoplastic elastomer, or a thermoset containing from 25 to about 400 parts of the alkaline earth metal compound per 100 parts of the polymer. A small amount of transition metal salts has further been found to greatly reduce the amount of carbon monoxide generated.

1 Claim, No Drawings

POLYMERS HAVING REDUCED CARBON MONOXIDE GENERATION UPON BURNING

CROSS-REFERENCE

This application is a continuation application of my prior application, Ser. No. 249,515 filed Mar. 31, 1981 and entitled "POLYMERS HAVING REDUCED CARBON MONOXIDE GENERATION UPON BURNING", now U.S. Pat. No. 4,361,668.

TECHNICAL FIELD

The present invention relates to reduced generation of carbon monoxide from a non-nitrogen-containing polymer by adding an alkaline earth metal hydroxide or oxide to a polymer, especially in combination with a transition metal salt.

BACKGROUND ART

Heretofore, flammability agents have been added to polymers to reduce the flammability thereof. Although the flammability may have been reduced, many polymers still burn, some without a flame. During the burning or combustion thereof, these polymers still generate carbon monoxide.

U.S. Pat. No. 4,141,931 to Deets et al relates to the reduction of amounts of hydrogen cyanide produced from nitrogen-containing polymers, through the use of an alkaline earth metal oxide in combination with a polysulfide rubber. No suggestion is contained to reduction of carbon monoxide with regard to non-nitrogen-containing polymers.

It is known to the prior art to scrub carbon monoxide from gas streams by the reaction of basic oxides and hydroxides. However, this does not relate to carbon monoxide abatement during burning of a polymer.

In an article Chemical Abstracts 14, 599 (1920), it is noted that calcium hydroxide reacts with carbon monoxide to yield calcium carbonate and hydrogen at 500° C. in the presence of water vapor. The rate of reaction is catalyzed by iron. However, once again, no suggestion is related to preventing carbon monoxide generation in burning polymers.

In an article by R. E. Wilson, et al, Industrial and Engineering Chemistry, 15(7), 698-701 (1923), it is noted that soda lime may be utilized to absorb carbon monoxide from gas streams. Soda lime is a mixture of sodium hydroxide and calcium oxide. However, once again, this article merely relates to absorption within a gas stream and not to the prevention of carbon monoxide generation by a burning polymer.

DISCLOSURE OF INVENTION

It is therefore an object of the present invention to provide a non-nitrogen-containing polymer wherein, upon burning or combustion, reduced amounts of carbon monoxide are generated.

It is another object of the present invention to provide a polymer having reduced carbon monoxide generation upon burning, as above, wherein said polymer is an elastomer, either cured or uncured, a thermoplastic, a thermoplastic elastomer (either cured or uncured), or a thermoset.

It is yet another object of the present invention to provide a polymer having reduced carbon monoxide generation upon burning, as above, wherein modification of said polymer is readily achieved and yet is inexpensive.

It is yet another object of the present invention to provide a polymer having reduced carbon monoxide generation upon burning, as above, wherein said polymer has improved flame resistance.

It is yet another object of the present invention to provide a polymer having reduced carbon monoxide generation upon burning, as above, wherein said polymer yields a reduced smoke density.

It is yet another object of the present invention to provide a polymer having reduced carbon monoxide generation upon burning, as above, wherein alkaline earth metal salts are added to said polymer.

It is yet another object of the present invention to provide a polymer having reduced carbon monoxide generation upon burning, as above, wherein said salts are oxides or hydroxides.

It is yet another object of the present invention to provide a polymer having reduced carbon monoxide generation upon burning, as above, wherein said polmer has incorporated therein a transition metal salt to promote the efficiency of said alkaline earth metal compound in preventing carbon monoxide generation.

It is yet another object of the present invention to provide a polymer having reduced carbon monoxide generation upon burning, as above, wherein said transition metal salt is the metal salt of a fatty acid, or of a dicarboxylic acid; that is, the metal mono- and dicarboxylates, as well as the metal salts of a detergent, and of an anion such as a carbonate, a sulfate, a nitrate, a phosphate, a chloride, a sulfide, an oxide, and the like.

These and other objects of the present invention will become apparent from the specification.

In general, a polymeric composition having a reduced carbon monoxide generation upon burning, comprises: a nitrogen-free polymer, said polymer selected from the group consisting of an elastomer, a thermoplastic, a thermoplastic elastomer, a thermoset, and combinations thereof; said polymeric composition containing an alkaline earth metal salt, the amount of said alkaline earth metal salt ranging from about 25 parts to about 400 parts per 100 parts of said nitrogen-free polymer.

BEST MODE FOR CARRYING OUT THE INVENTION

According to the concepts of the present invention, a polymer is modified by the addition of an alkaline earth metal salt, often in combination with a transition metal salt. The polymers specifically relate to non-nitrogen-containing polymers, that is polymers which do not contain a nitrogen atom in the structure, either in the backbone of the polymer chain, in a side chain, or as a radical attached thereto. Basically, the polymers are divided into four types, elastomer, thermoplastic, thermoplastic elastomer, or thermoset.

Considering the elastomers or rubbers, they can be cured or uncured, depending upon their use, but usually are cured. The nitrogen-free or non-nitrogen-containing rubbers are well known to those skilled in the art and can be found in any number of textbooks, publications, and the like. By way of example, specific elastomers include natural rubber, synthetic cis-1,4-polyisoprene, the various chlorinated rubbers, polymers made from conjugated dienes having from 4 to 10 carbon atoms with (1) vinyl substituted aromatic compounds having from 8 to 12 carbon atoms, or (2) unsaturated carboxylic acids. Specific examples include styrene, alpha-methylstyrene, itaconic acid, methacrylic acid, etc., and the like. Well known copolymers include styrene-butadiene rubber and carboxylated styrene-butadiene rubber as well as carboxylated rubbers and copolymers of such rubbers with styrene-butadiene rubber. Butyl rubber is yet another elastomer which is made from isobutylene with a small amount of isoprene monomers. Polychloroprene is yet another example. Still other elastomers include the EPDM rubbers, that is rubbers made from monomers of ethylene and propylene which have a small amount of diene content therein, the silicone rubbers, and the like. However, polysulfide elastomers do not constitute an elastomer use in the present invention, or part of the present invention. The above elastomers, as well as other elastomers, are known to the art along with their method of preparation.

Any non-nitrogen-containing thermoplastic can be utilized. Such thermoplastics are well documented in the various literature known to those skilled in the art and can be prepared according to commonly known and available techniques. Specific examples of thermoplastic elastomers include those made from olefins, such as those having from 2 to 6 carbon atoms. Specific examples include polyethylene, polypropylene, polybutylene, and the like. Another class is the vinyl substituted aromatics having from 8 to 12 carbon atoms, such as styrene, etc. The vinyl esters containing from 2 to 8 carbon atoms in the repeating group can also be utilized such as polyvinyl acetate. The chlorine and fluorine-containing polymers may also be utilized, as for example, polyvinyl chloride, polyvinyl fluoride, polyvinylidene fluoride, polytetrafluoroethylene, as well as polymers having combinations of chlorine or chlorine-containing monomers therein. Yet another class is the various polyethers such as polyoxymethylene. In general, the cellulosic polymers such as rayon and cellophane may also be utilized, as can the numerous types of polyesters. Moreover, any of the thermoplastics which are ethers such as polyoxymethylene. In general, the cellulosic polymers such as rayon and cellophane may also be utilized, as can the numerous types of polyesters. Moreover, any of the thermoplastics which are known to the art or literature and not specifically mentioned herein can also be utilized.

Yet another class of polymers is the various thermosets known to the art or the literature. Specific examples include the various phenolic resins, the various epoxy resins, the various thermoset polyesters, and the various silicone polymers.

Yet another class of polymers include the so-called thermoplastic elastomers which generally possess good physical properties and yet can be cured. Specific examples include block styrene-butadiene copolymers, the block styrene-butadiene-styrene copolymers, and the hydrogenated block styrene-butadiene polymer, and the like.

The compounds which are utilized in the non-nitrogen-containing polymers are the alkaline earth salts. Desirably, the anion is an oxide or an hydroxide including the various hydrates thereof. The various alkaline earth metals which are utilized include beryllium, magnesium, calcium, strontium, and barium. Generally, barium is desired, with calcium being preferred. Of the various alkaline earth metal hydroxyl or oxides, calcium hydroxide is preferred. Additionally, magnesium hydroxide, in combination with aluminum hydroxide, can be used.

The total amount of the alkaline earth metal salt or salts which is incorporated into the polymer ranges generally from about 25 parts to about 400 parts by weight per 100 parts of polymer. This is true whether the polymer be an elastomer, a thermoplastic, a thermoplastic elastomer, or a thermoset. Generally, from 50 to about 150 parts is desired, with from about 75 to 150 parts by weight being preferred per 100 parts of elastomer or thermoset. With regard to the thermoplastic, as well as thermoplastic elastomer compounds, although from 25 to about 400 parts may be utilized, from 25 to about 100 parts are desirable, with from about 15 to about 50 parts by weight being preferred per 100 parts of the thermoplastic or the thermoplastic elastomer.

The various alkaline earth metal salts can be readily incorporated into the polymer before any article-forming process as by utilizing any conventional mixing or blending apparatus. Then, the modified polymer may be injection molded, extruded, and otherwise processed according to any conventional manner. In situations wherein the polymer is a thermosetting polymer, the alkaline earth metal salt may be mixed with the monomers or uncured resins before application to a mold or other container wherein the final article is formed.

It has been found that the generation of carbon monoxide is unexpectantly further reduced by the use of various catalytic agents. These catalysts include the various transition metal salts with manganese, iron, and cobalt being preferred, of monocarboyxlic acids, of dicarboxylic acids, of detergents, and of various salts wherein the anion portion is a carbonate, a sulfate, a nitrate, a phosphate, a chloride, a sulfide, an oxide, and the like. By transition metal salt is meant the salts generally set forth in Groups $3a$ through $7a$, Group 8, and Groups $1b$ and $2b$ of the Periodic Table of the Elements. That is, elements having an Atomic Number 21 through 30, and the elements located directly below these elements in the Periodic Table. The monocarboxylic acids have from 2 to 30 carbon atoms, whereas the dicarboyxlic acids have from about 4 to about 18 carbon atoms. Whenever the term octoate is utilized, it is to be understood that it generally refers to the salt of 2-ethylhexanoic acid. Examples of specific catalysts include iron acetate, iron propionate, iron octoate, iron stearate, iron oleate, iron laurate, iron fumarate, iron citrate, iron tartate, cobalt acetate, cobalt propionate, cobalt octoate, cobalt stearate, cobalt laurate, cobalt naphthenate, manganese acetate, manganese octoate, manganese stearate, manganese laurate, manganese oleate, and the like. Considering the detergents, they are well known to those skilled in the art. Generally, a detergent is classified as containing as a principal constituent such as a fatty acid, a fatty alcohol, rosin, a napthenic acid hydrophobic group, an ether linkage, and an anionic hydrophilic group, for example, carboxylate, sulfate, sulfonate, and the like. Specific examples of detergents include sodium, ammonium, or a transition metal stearate, laurate, octoate, naphthenate, palmitate and the like. Considering the anions which form catalysts of the present invention with the transition metals, they include carbonate, sulfate, sulfide, phosphate, nitrate, chloride, oxide, and the like. Specific examples of such compounds include iron carbonate, iron phosphate, cobalt carbonate, cobalt phosphate, and the like. As should be apparent from the above, the various classes of the catalysts overlap one another. Of the various catalysts, the salts of the monocarboxylic acids such as the iron carboxylates, especially iron stearate, iron naphthenate, and iron octoate, are preferred. The amount of the catalysts generally ranges from about 0.1 to about 10 parts per 100 parts of polymer, desirably from about 0.5 to about 4 parts and preferably from about 1 to about 3 parts by weight.

Various conventional additives may be added to the various polymers as well known to the art. For example, colorants, antioxidants, fillers, reinforcing agents, processing aids, antistatic agents, heat stabilizers, vulcanizing agents, etc. The amounts of these components are conventional and are also well known to the art.

Examples of specific uses of the polymers of the present invention include those which may be subject to fires or burning such as cushioning, molded goods, wire jackets, reinforced plastics, plastics used in furniture or appliances, wallpaper, and the like.

The invention will be better understood by reference to the following examples.

EXAMPLES

Elastomer stocks were mixed by standard techniques utilizing the recipe set forth in Table I.

TABLE I

| INGREDIENT | A | B | C | D |
|---|---|---|---|---|
| | (amount by weight) | | | |
| Emulsion SBR* | 100 | 100 | 100 | 100 |
| Hydrated Alumina, Alcoa C331 | 100 | — | — | — |
| Calcium Hydroxide,—manufavtured by MCB | — | 100 | 100 | |
| Treated Calcium Hydroxide - Iron Octoate | — | 100 | — | — |
| Cobalt Carbonate | — | — | 3.2 | — |
| Zinc Oxide | 2.0 | 2.0 | 2.0 | 2.0 |
| Sulfur | 2.0 | 2.0 | 2.0 | 2.0 |
| Stearic Acid | 2.0 | 2.0 | 2.0 | 2.0 |
| (N—t-butyl) mercaptobenzothiazole sulfenamide | 1.0 | 1.0 | 1.0 | 1.0 |

*Weight average molecular weight of about 440,000 containing approximately 23 percent styrene by weight.

The iron octoate treated calcium hydroxide was prepared by diluting 33.3 grams of a 6 percent iron octoate in 200 milliliters of hexane. The resulting solution was added to 100 grams of calcium hydroxide in a mixing bowl and agitated until the solid was evenly dispersed. The solvent was removed from the resulting slurry under reduced pressure. The stripped powder was dried by heating at 50° C. in a vacuum oven overnight.

The stocks in A through D were mixed with a Brabender mixer and then milled. They were then cured at 300° F. for 25 minutes for testing. A Draeger tube was placed in a National Bureau of Standard Smoke Density Chamber [see ASTM Special Technical Publication 422, pp 166–204 (1969)] and analysis of the carbon monoxide content as well as of the smoke yield (maximum specific optical density divided by the weight of the sample, Dm/g) for both flaming and non-flaming conditions were made.

TABLE II

| | a | B | C | D |
|---|---|---|---|---|
| Carbon Monoxide (Flaming) mg/g | 14.7 | 10.5 | 15.3 | 14.3 |
| Carbon Monoxide (Non-Flaming) mg/g | 12.4 | 1.2 | 4.2 | 11.6 |
| Smoke Yield Dm/g (Flaming) | 31.3 | 11.3 | 17.0 | 19.6 |
| Smoke Yield Dm/g (Non-Flaming) | 23 | 10.8 | 12.2 | 11.4 |

As apparent from Table II, the use of calcium hydroxide, Example D, does reduce the amount of carbon monoxide in both the flaming and non-flaming tests when compared to hydrated alumina, Example A, a known flame retardant. Moreover, the calcium hydroxide significantly reduces the amount of smoke density. However, the use of both cobalt carbonate and especially iron octoate in association with calcium hydroxide, Example C and B respectively, resulted in large reductions in the amount of CO emission, especially non-flaming.

While in accordance with the patent statutes, only the best mode and preferred embodiment of the invention have been set forth, reference should be had to the appended claims with regard to the scope of the invention.

What is claimed is:
1. A polymeric composition comprising:
a nitrogen-free polymer selected from the group consisting of an elastomer, a thermoplastic, a thermoplastic elastomer, a thermoset, and combinations thereof;
the polymeric composition containing an alkaline earth metal salt, the amount of said alkaline earth metal salt ranges from about 50 parts to about 150 parts by weight per 100 parts of said elastomer polymer or said thermoset polymer;
wherein the amount of said alkaline earth metal salt ranges from about 25 parts to about 100 parts by weight per 100 parts of said thermoplastic or said thermoplastic elastomer,
wherein said alkaline earth metal salt is calcium hydroxide, said polymeric composition containing a catalyst, said catalyst being a metal salt of a compound selected from the group consisting of a monocarboxylic acid having from 2 to 30 carbon atoms, a dicarboxylic acid having from 4 to 18 carbon atoms, a detergent, an anion, and combinations thereof, the amount of said catalyst ranging from about 0.1 to about 10 parts by weight per 100 parts of said polymer;
wherein said metal portion of said catalyst is selected from the group consisting of iron, cobalt, manganese, and combinations thereof; and
wherein said polymeric composition has reduced smoke generation upon burning in the absence of an open flame.

* * * * *

UNITED STATES PATENT AND TRADEMARK OFFICE
CERTIFICATE OF CORRECTION

PATENT NO. : 4,454,280
DATED : June 12, 1984
INVENTOR(S) : David F. Lawson

It is certified that error appears in the above-identified patent and that said Letters Patent are hereby corrected as shown below:

Table I
Column 5, Line 30 should read:

|  | C | D |
|---|---|---|
| Calcium Hydroxide | 100 | 100 |
| Delete B | 100 | |

Signed and Sealed this

Twenty-third Day of October 1984

[SEAL]

Attest:

GERALD J. MOSSINGHOFF

Attesting Officer — Commissioner of Patents and Trademarks